United States Patent
Ahn et al.

(10) Patent No.: US 12,129,374 B2
(45) Date of Patent: Oct. 29, 2024

(54) ACRYLIC GRAFT COPOLYMER, METHOD OF PREPARING THE SAME, AND THERMOPLASTIC RESIN COMPOSITION INCLUDING THE SAME

(71) Applicant: LG CHEM, LTD., Seoul (KR)

(72) Inventors: Bong Keun Ahn, Daejeon (KR); Yong Yeon Hwang, Daejeon (KR); Min Jung Kim, Daejeon (KR); Jang Won Park, Daejeon (KR); Jiyoon Jeon, Daejeon (KR); Eunji Lee, Daejeon (KR); Seyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 653 days.

(21) Appl. No.: 17/415,690

(22) PCT Filed: Sep. 11, 2020

(86) PCT No.: PCT/KR2020/012285
§ 371 (c)(1),
(2) Date: Jun. 17, 2021

(87) PCT Pub. No.: WO2021/066345
PCT Pub. Date: Apr. 8, 2021

(65) Prior Publication Data
US 2022/0073723 A1 Mar. 10, 2022

(30) Foreign Application Priority Data

Sep. 30, 2019 (KR) .................. 10-2019-0120583
Sep. 7, 2020 (KR) .................. 10-2020-0113904

(51) Int. Cl.
*C08L 51/00* (2006.01)
*C08L 51/04* (2006.01)

(52) U.S. Cl.
CPC ............ *C08L 51/003* (2013.01); *C08L 51/04* (2013.01); *C08L 2201/08* (2013.01); *C08L 2207/53* (2013.01)

(58) Field of Classification Search
CPC .. C08L 5/003; C08L 2201/08; C08L 2207/53; C08L 51/04
USPC ....................................................... 523/201
See application file for complete search history.

(56) References Cited

U.S. PATENT DOCUMENTS

| | | | | |
|---|---|---|---|---|
| 4,419,471 | A | * 12/1983 | Nelsen | C08K 5/13 525/902 |
| 2007/0287799 | A1 | 12/2007 | Ha et al. | |
| 2014/0235749 | A1* | 8/2014 | Kim | C08F 291/12 525/85 |

FOREIGN PATENT DOCUMENTS

| | | |
|---|---|---|
| CN | 104419191 A | 3/2015 |
| CN | 106188927 A | 12/2016 |
| CN | 109401103 A | 3/2019 |
| JP | 2003-192742 A | 7/2003 |
| JP | 2009-540045 A | 11/2009 |
| JP | 2012236871 A | * 12/2012 |
| KR | 10-2001-0066310 A | 7/2001 |
| KR | 10-2007-0117315 A | 12/2007 |
| KR | 10-2008-0044141 A | 5/2008 |
| KR | 10-2015-0026532 A | 3/2015 |
| KR | 10-2018-0047949 A | 5/2018 |
| KR | 10-2018-0052254 A | 5/2018 |
| TW | 200801052 A | 1/2008 |
| WO | WO2007_004670 A | 1/2009 |

OTHER PUBLICATIONS

Extended European Search report for related application EP 20871540.9, mailed Jan. 25, 2022.
B. You et al., "Synthesis of a Core-Shell Polyacrylate Elastomer Containing Ultraviolet Stabilizer and Its Application in Polyoxymethylene", Polymer Engineering and Science, vol. 52, No. 11, Nov. 1, 2012.
The Office Action for Indian Patent Application No. 202117027944, dated Sep. 14, 2023.

\* cited by examiner

*Primary Examiner* — Ruiyun Zhang

(57) ABSTRACT

The present invention relates to an acrylic graft copolymer, a method of preparing the same, and a thermoplastic resin composition including the same. More specifically, the acrylic graft copolymer of the present invention includes a seed, a core, and a graft shell. In this case, the graft shell includes 0.05 to 2 parts by weight of a reactive ultraviolet stabilizer based on 100 parts by weight of the acrylic graft copolymer, and the graft shell has an average particle diameter of 80 to 140 nm (greater than the average particle diameter of the core). The acrylic graft copolymer of the present invention has excellent impact strength, tensile strength, weather resistance, and surface gloss. In addition, when the acrylic graft copolymer is used, mold deposits may be reduced.

14 Claims, No Drawings

ACRYLIC GRAFT COPOLYMER, METHOD OF PREPARING THE SAME, AND THERMOPLASTIC RESIN COMPOSITION INCLUDING THE SAME

This application is a National Phase of International Application No. PCT/KR2020/012285 which claims priority to Korean Patent Application No. 10-2019-0120583, filed on Sep. 30, 2019, and Korean Patent Application No. 10-2020-0113904, re-filed on Sep. 7, 2020, based on the priority of the above patent, in the Korean Intellectual Property Office, the disclosures of each of which are incorporated herein by reference.

CROSS-REFERENCE TO RELATED APPLICATIONS

This application claims priority to Korean Patent Application No. 10-2019-0120583, filed on Sep. 30, 2019, and Korean Patent Application No. 10-2020-0113904, re-filed on Sep. 7, 2020, based on the priority of the above patent, in the Korean Intellectual Property Office, the disclosures of each of which are incorporated herein by reference.

TECHNICAL FIELD

The present invention relates to an acrylic graft copolymer, a method of preparing the same, and a thermoplastic resin composition including the same. More particularly, the present invention relates to an acrylic graft copolymer including a seed, a core, and a graft shell, wherein the graft shell contains a reactive ultraviolet stabilizer; a method of preparing the acrylic graft copolymer; and a thermoplastic resin composition including the acrylic graft copolymer. With this composition, a product prepared using the thermoplastic resin composition including the acrylic graft copolymer of the present invention may have excellent mechanical properties, weather resistance, and surface gloss, and mold deposits on the product may be reduced.

BACKGROUND ART

Acrylonitrile-butadiene-styrene resins (hereinafter referred to as "ABS resins") based on conjugated diene rubber have excellent processability, mechanical properties, and appearance, and thus are used in various fields such as parts of electric and electronic products, automobiles, small toys, furniture, and construction materials. However, since ABS resins include butadiene rubber having chemically unstable unsaturated bonds, ABS resins have very poor weather resistance due to aging of a rubber polymer by ultraviolet, and thus are not suitable as outdoor materials.

To solve the above-described problems of ABS resins, acrylic copolymers represented by acrylate-styrene-acrylonitrile graft copolymers (hereinafter referred to as "ASA resins") without ethylenically unsaturated bonds have been used. ASA resins have excellent weather resistance and aging resistance, and are used in various fields such as automobiles, ships, leisure goods, construction materials, and gardening goods.

In recent years, as the degree of weather resistance of ASA resins required in the market increases, to meet this demand, rubber having a small particle diameter is used, or a method of copolymerizing an acrylate monomer including methyl methacrylate (hereinafter referred to as "MMA") with styrene and acrylonitrile during shell polymerization or a method of adding a matrix resin including MMA during compounding is used.

However, when rubber having a small particle diameter is used to prepare an ASA resin, the mechanical properties, such as impact resistance, of the ASA resin may deteriorate. When an acrylate monomer including MMA is added during shell polymerization, or when MMA is included in a matrix resin, weather resistance may be improved, but heat resistance may be reduced.

In addition, in the case of improving weather resistance by adding an ultraviolet stabilizer when compounding a thermoplastic resin composition containing an ASA resin, due to mold deposits, which are decomposition products generated due to volatilization of the ultraviolet stabilizer and attached to a mold during long-term injection molding, problems such as molding defects and gloss defects arise, and the mold deposits are often not easily removed. To solve these problems, a high-molecular-weight ultraviolet stabilizer may be used to suppress volatilization of the ultraviolet stabilizer during injection. However, due to increased molecular weight, the amount of the ultraviolet stabilizer added must be increased to maintain weather resistance. As a result, physical properties decrease and production cost increases.

Therefore, a resin capable of improving the weather resistance of an ASA resin and suppressing volatilization of an ultraviolet stabilizer to reduce mold deposits needs to be developed.

RELATED ART DOCUMENTS

[Patent Documents] KR 2001-0066310 A

DISCLOSURE

Technical Problem

Therefore, the present invention has been made in view of the above problems, and it is one object of the present invention to provide an acrylic graft copolymer capable of imparting excellent mechanical properties, weather resistance, and surface gloss and reducing mold deposits.

It is another object of the present invention to provide a method of preparing the above-described acrylic graft copolymer.

It is yet another object of the present invention to provide a thermoplastic resin composition including the above-described acrylic graft copolymer.

The above and other objects can be accomplished by the present disclosure described below.

Technical Solution

In accordance with one aspect of the present invention, provided is an acrylic graft copolymer including, based on 100 parts by weight in total of monomers used in preparation of the acrylic graft copolymer, (A) a seed prepared by polymerizing 4 to 25% by weight of one or more selected from the group consisting of an aromatic vinyl compound, a vinyl cyanide compound, and an alkyl acrylate compound; (B) a rubber core formed to surround the seed and prepared by polymerizing 25 to 55% by weight of an alkyl acrylate compound; and (C) a graft shell formed to surround the rubber core and prepared by polymerizing 40 to 70% by weight of one or more selected from the group consisting of an aromatic vinyl compound and a vinyl cyanide compound, wherein the graft shell includes 0.05 to 2 parts by weight of a reactive ultraviolet stabilizer based on 100 parts by weight of the acrylic graft copolymer, and the graft shell has an average particle diameter of 80 to 140 nm (greater than an average particle diameter of the core).

In accordance with another aspect of the present invention, provided is a method of preparing an acrylic graft copolymer, the method including, based on 100 parts by weight in total of monomers used in preparation of the acrylic graft copolymer, (A) a seed preparation step of preparing a seed by polymerizing 4 to 25% by weight of one or more selected from the group consisting of an aromatic vinyl compound, a vinyl cyanide compound, and an alkyl acrylate compound and 1.4 to 2.4 parts by weight of an emulsifier; (B) a core preparation step of preparing a core by adding and polymerizing 25 to 55% by weight of an alkyl acrylate compound in presence of the prepared seed; and (C) a graft shell preparation step of preparing a shell by adding and graft-polymerizing 40 to 70% by weight of one or more selected from the group consisting of an aromatic vinyl compound and a vinyl cyanide compound and 0.05 to 2 parts by weight of a reactive ultraviolet stabilizer in presence of the prepared core, wherein the shell has an average particle diameter of 80 to 140 nm (greater than an average particle diameter of the core).

In accordance with yet another aspect of the present invention, provided is a thermoplastic resin composition including 20 to 50 parts by weight of the acrylic graft copolymer; 1 to 15 parts by weight of an acrylate-aromatic vinyl compound-vinyl cyanide compound copolymer containing a rubber polymer having an average particle diameter of 0.2 to 0.7 μm; and 45 to 70 parts by weight of a rigid matrix resin.

Advantageous Effects

According to the present invention, an acrylic graft copolymer, a method of preparing the same, and a thermoplastic resin composition including the same are provided. Since a reactive ultraviolet stabilizer is included in the graft shell of the acrylic graft copolymer, a molded article manufactured using the thermoplastic resin composition including the acrylic graft copolymer has excellent mechanical properties, weather resistance, and surface gloss, and mold deposits on the molded article are reduced. Thus, the appearance and productivity of the molded article can be improved.

BEST MODE

Hereinafter, an acrylic graft copolymer of the present invention will be described in detail.

The present inventors confirmed that, when a reactive ultraviolet stabilizer was incorporated in the backbone of a polymer constituting the shell of an acrylic graft copolymer including a seed, a core, and a shell, volatilization of the ultraviolet stabilizer was suppressed during injection molding, thereby reducing mold deposits and greatly improving weather resistance. Based on these results, the present inventors conducted further studies to complete the present invention.

The acrylic graft copolymer of the present invention will be described in detail as follows.

The acrylic graft copolymer of the present invention includes, based on 100 parts by weight in total of monomers used in preparation of the acrylic graft copolymer, (A) a seed prepared by polymerizing 4 to 25% by weight of one or more selected from the group consisting of an aromatic vinyl compound, a vinyl cyanide compound, and an alkyl acrylate compound; (B) a rubber core formed to surround the seed and prepared by polymerizing 25 to 55% by weight of an alkyl acrylate compound; and (C) a graft shell formed to surround the rubber core and prepared by polymerizing 40 to 70% by weight of one or more selected from the group consisting of an aromatic vinyl compound and a vinyl cyanide compound. In this case, the graft shell includes 0.05 to 2 parts by weight of a reactive ultraviolet stabilizer based on 100 parts by weight of the acrylic graft copolymer, and the graft shell has an average particle diameter of 80 to 140 nm (greater than the average particle diameter of the core). In this case, mechanical properties, weather resistance, and surface gloss may be excellent, and mold deposits may be reduced.

In the present invention, the monomers refer to the aromatic vinyl compound, the vinyl cyanide compound, and the alkyl acrylate compound included in the acrylic graft copolymer.

In the present invention, mold deposits refer to deposits formed when decomposition products generated due to volatile materials during long-term injection molding, i.e., when performing more than 100 injections of a resin under the same injection conditions, are attached to a mold. When mold deposits are attached to a mold, defects such as short molding, poor gloss, insufficient weight, poor appearance, and poor mold release may occur, and the attached mold deposits are often not easily removed.

Each component of the acrylic graft copolymer of the present invention will be described in detail as follows.

(A) Seed

For example, the seed may be prepared by polymerizing 4 to 25% by weight, preferably 10 to 20% by weight, more preferably 13 to 17% by weight of one or more selected from the group consisting of an aromatic vinyl compound, a vinyl cyanide compound, and an alkyl acrylate compound. Within this range, impact strength, tensile strength, weather resistance, and surface gloss may be excellent.

For example, the seed may have an average particle diameter of 42 to 82 nm, preferably 45 to 80 nm, more preferably 50 to 75 nm. Within this range, impact strength, tensile strength, weather resistance, and surface gloss may be excellent.

In the present invention, an average particle diameter may be measured by dynamic light scattering, and specifically, may be measured as an intensity value in a Gaussian mode using a Nicomp 380 (manufacturer: PSS).

In addition, in the present invention, an average particle diameter may mean an arithmetic average particle diameter in a particle size distribution measured by dynamic light scattering, i.e., an average particle diameter of intensity distribution.

For example, the seed may be a rubber polymer prepared by polymerizing 1.4 to 2.4 parts by weight, preferably 1.7 to 2.2 parts by weight of an emulsifier based on 100 parts by weight in total of monomers used in preparation of the acrylic graft copolymer. Within this range, impact strength, tensile strength, weather resistance, and surface gloss may be excellent.

(B) Core

For example, the core may be a rubber core formed to surround the seed and prepared by polymerizing 25 to 55% by weight, preferably 30 to 45% by weight, more preferably 33 to 40% by weight of an alkyl acrylate compound. In this case, impact strength, tensile strength, weather resistance, and surface gloss may be excellent.

For example, the average particle diameter of the core including the seed may be 62 to 110 nm, preferably 70 to 105 nm (greater than the average particle diameter of the seed). Within this range, impact strength, tensile strength, weather resistance, and surface gloss may be excellent.

For example, the core may be a rubber polymer prepared by polymerizing one or more selected from the group consisting of a crosslinking agent, an initiator, and an emulsifier. In this case, impact strength, tensile strength, weather resistance, and surface gloss may be excellent.

(C) Graft Shell

For example, the graft shell may be a polymer formed to surround the rubber core and prepared by polymerizing 40 to 70% by weight, preferably 45 to 60% by weight, more preferably 45 to 54% by weight of one or more selected from the group consisting of an aromatic vinyl compound and a vinyl cyanide compound. In this case, impact strength, tensile strength, weather resistance, and surface gloss may be excellent.

For example, the average particle diameter of the graft shell including the seed and the core may be 80 to 140 nm, preferably 88 to 135 nm. Within this range, impact strength, tensile strength, weather resistance, and surface gloss may be excellent.

For example, the graft shell may include 0.05 to 2 parts by weight, preferably 0.1 to 1.5 parts by weight, more preferably 0.2 to 1.3 parts by weight, still more preferably 0.3 to 1 part by weight of a reactive ultraviolet stabilizer based on 100 parts by weight of the acrylic graft copolymer. Within this range, impact strength, tensile strength, weather resistance, and surface gloss may be excellent, and mold deposits may be reduced.

For example, the reactive ultraviolet stabilizer may be incorporated into the backbone of one or more selected from the group consisting of an aromatic vinyl compound and a vinyl cyanide compound included in the graft shell, so that volatilization of the ultraviolet stabilizer may be suppressed during injection. Thereby, formation of mold deposits in a mold during long-term injection molding may be prevented. In addition, compared to the case of compounding the ultraviolet stabilizer as an additive, weather resistance may be improved, and mold deposits may be greatly reduced.

For example, the reactive ultraviolet stabilizer may be a benzotriazole-based reactive ultraviolet stabilizer, a benzophenone-based reactive ultraviolet stabilizer, or a mixture thereof. In this case, volatilization of the ultraviolet stabilizer during long-term injection molding may be suppressed, thereby reducing mold deposits. In addition, weather resistance and surface gloss may be excellent.

Specifically, the benzotriazole-based reactive ultraviolet stabilizer may be a compound represented by Chemical Formula 1 below, and the benzophenone-based reactive ultraviolet stabilizer may be a compound represented by Chemical Formula 2 below, a compound represented by Chemical Formula 3 below, or a mixture thereof. In this case, volatilization of the ultraviolet stabilizer during long-term injection molding may be suppressed, thereby reducing mold deposits. In addition, weather resistance and surface gloss may be excellent.

[Chemical Formula 1]

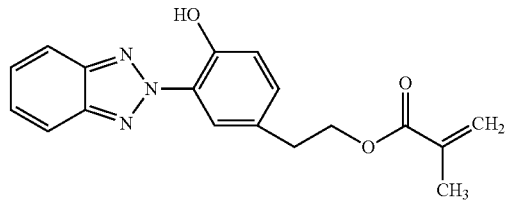

[Chemical Formula 2]

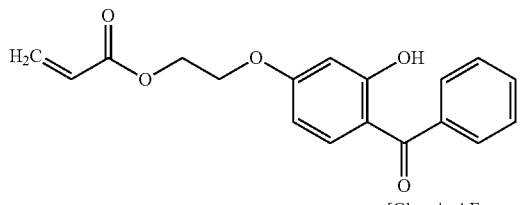

[Chemical Formula 3]

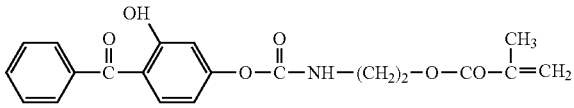

For example, the graft shell may be a polymer prepared by polymerizing a reactive emulsifier, and the reactive emulsifier may be included in an amount of 0.1 to 3 parts by weight, preferably 0.5 to 2.5 parts by weight, more preferably 1 to 2.5 parts by weight based on 100 parts by weight in total of monomers used in preparation of the acrylic graft copolymer. Within this range, impact strength, tensile strength, weather resistance, and surface gloss may be excellent.

For example, the reactive emulsifier may be an emulsifier including one or more functional groups selected from the group consisting of carbonates, sulfonates, and sulfates. In this case, impact strength, tensile strength, weather resistance, and surface gloss may be excellent.

As a specific example, the reactive emulsifier may include one or more selected from the group consisting of sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid di-potassium salt, and sodium methallyl sulfonate. In this case, impact strength, tensile strength, weather resistance, and surface gloss may be excellent.

For example, the alkyl acrylate compound may include one or more selected from the group consisting of alkyl acrylates having 2 to 8 carbon atoms. Preferably, the alkyl acrylate compound is an alkyl acrylate containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene. Preferably, the aromatic vinyl compound is styrene.

For example, the vinyl cyanide compound may be acrylonitrile, methacrylonitrile, or a mixture thereof, preferably acrylonitrile.

For example, the acrylic graft copolymer may have a grafting degree of 20 to 33%, preferably 21 to 32%, more preferably 26 to 32%. Within this range, impact strength, tensile strength, weather resistance, and surface gloss may be excellent, and mold deposits may be reduced.

In the present invention, when a grafting degree is measured, graft polymer latex is coagulated, washed, and dried to obtain powdered graft polymer latex, and 30 ml of acetone is added to 1 g of the powdered graft polymer latex, followed by stirring for 24 hours. Then, centrifugation is performed to separate insoluble matter that is not dissolved in acetone, followed by drying. Then, the weight of the insoluble matter is measured. The measured value is substituted into Equation 1 below to calculate a grafting degree.

Grafting degree (%)=(Weight of grafted monomer (g)/Weight of rubber (g))×100  [Equation 1]

In addition, the method of preparing the acrylic graft copolymer of the present invention includes, for example, based on 100 parts by weight in total of monomers used in preparation of the acrylic graft copolymer, (A) a seed preparation step of preparing a seed by polymerizing 4 to 25% by weight of one or more selected from the group consisting of an aromatic vinyl compound, a vinyl cyanide compound, and an alkyl acrylate compound; (B) a core preparation step of preparing a core by adding and polymerizing 25 to 55% by weight of an alkyl acrylate compound in the presence of the prepared seed; and (C) a graft shell preparation step of preparing a shell by adding and graft-polymerizing 40 to 70% by weight of one or more selected from the group consisting of an aromatic vinyl compound and a vinyl cyanide compound and 0.05 to 2 parts by weight of a reactive ultraviolet stabilizer in the presence of the prepared core. In this case, the shell has an average particle diameter of 80 to 140 nm (greater than the average particle diameter of the core). In this case, impact strength, tensile strength, weather resistance, and surface gloss may be excellent, and mold deposits may be reduced.

For example, the reactive ultraviolet stabilizer may be a benzotriazole-based reactive ultraviolet stabilizer, a benzophenone-based reactive ultraviolet stabilizer, or a mixture thereof. In this case, volatilization of the ultraviolet stabilizer during long-term injection molding may be suppressed, thereby reducing mold deposits. In addition, weather resistance and surface gloss may be excellent.

As a specific example, the benzotriazole-based reactive ultraviolet stabilizer may be a compound represented by Chemical Formula 1 below, and the benzophenone-based reactive ultraviolet stabilizer may be a compound represented by Chemical Formula 2 below, a compound represented by Chemical Formula 3 below, or a mixture thereof. In this case, volatilization of the ultraviolet stabilizer during long-term injection molding may be suppressed, thereby reducing mold deposits. In addition, weather resistance and surface gloss may be excellent.

[Chemical Formula 1]

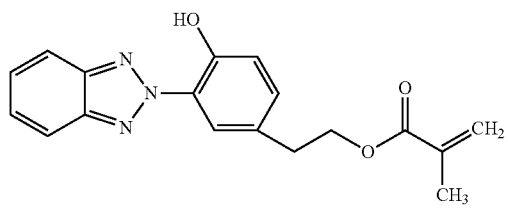

[Chemical Formula 2]

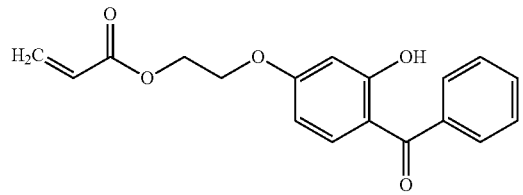

[Chemical Formula 3]

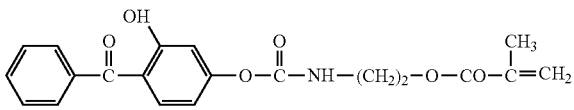

For example, in the graft shell preparation step, a reactive emulsifier may be included in an amount of 0.1 to 3 parts by weight, preferably 0.5 to 2.5 parts by weight, more preferably 1 to 2.5 parts by weight based on 100 parts by weight in total of monomers used in preparation of the acrylic graft copolymer. Within this range, impact strength, tensile strength, weather resistance, and surface gloss may be excellent.

For example, the reactive emulsifier may be an emulsifier including one or more functional groups selected from the group consisting of carbonates, sulfonates, and sulfates. In this case, impact strength, tensile strength, weather resistance, and surface gloss may be excellent.

For example, in the seed preparation step, an emulsifier is preferably included in an amount of 1.4 to 2.4 parts by weight, more preferably 1.7 to 2.2 parts by weight based on 100 parts by weight in total of monomers used in preparation of the acrylic graft copolymer. Within this range, impact strength, tensile strength, weather resistance, and surface gloss may be excellent.

For example, in the seed preparation step, one or more selected from the group consisting of an electrolyte, a crosslinking agent, a grafting agent, an initiator, and an emulsifier may be included. In this case, impact strength, tensile strength, weather resistance, and surface gloss may be excellent.

Specifically, in the seed preparation step, based on 100 parts by weight in total of monomers used in preparation of the acrylic graft copolymer, 0.001 to 1 part by weight of an electrolyte, 0.01 to 1 part by weight of a crosslinking agent, 0.01 to 3 parts by weight of a grafting agent, and 0.01 to 3 parts by weight of an initiator may be included. Within this range, impact strength, tensile strength, weather resistance, and surface gloss may be excellent.

For example, in the core preparation step, one or more selected from the group consisting of a crosslinking agent, an initiator, and an emulsifier may be included.

Specifically, in the core preparation step, based on 100 parts by weight in total of monomers used in preparation of the acrylic graft copolymer, 0.01 to 1 part by weight of a crosslinking agent, 0.01 to 3 parts by weight of an initiator, and 0.01 to 5 parts by weight of an emulsifier may be included.

For example, in the graft shell preparation step, a crosslinking agent, an initiator, or a mixture thereof may be included.

Specifically, in the graft shell preparation step, based on 100 parts by weight in total of monomers used in preparation of the acrylic graft copolymer, 0.01 to 3 parts by weight of a crosslinking agent and 0.01 to 3 parts by weight of an initiator may be included.

For example, the electrolyte used in the seed preparation step may include one or more selected from the group consisting of KCl, NaCl, KHCO$_3$, NaHCO$_3$, K$_2$CO$_3$, Na$_2$CO$_3$, KHSO$_3$, NaHSO$_4$, Na$_2$S$_2$O$_7$, K$_4$P$_2$O$_7$, K$_3$PO$_4$, Na$_3$PO$_4$, Na$_2$HPO$_4$, KOH, and NaOH.

For example, the crosslinking agents used in the seed preparation step, the core preparation step, and the shell preparation step may include one or more selected from the group consisting of polyethylene glycol diacrylate, polyethylene glycol dimethacrylate, polypropylene glycol diacrylate, polypropylene glycol dimethacrylate, ethylene glycol diacrylate, ethylene glycol dimethacrylate, divinylbenzene, ethylene glycol dimethacrylate, diethylene glycol dimethacrylate, triethylene glycol dimethacrylate, 1,3-butadiol dimethacrylate, ethylene glycol diacrylate, hexanediol ethoxylate diacrylate, hexanediol propoxylate diacrylate, neopentyl glycol dimethacrylate, neopentyl glycol ethoxylate diacrylate, neopentyl glycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylate triacrylate, pentaerythritol propoxylate triacrylate, and vinyltrimethoxysilane.

For example, the grafting agent used in the seed preparation step may include one or more selected from the group consisting of allyl methacrylate (AMA), triallyl isocyanurate (TAIL), triallyl amine (TAA), and diallyl amine (DAA).

The initiators used in the seed preparation step and the core preparation step are preferably radical initiators without particular limitation.

For example, the radical initiators may include one or more selected from the group consisting of inorganic peroxides such as sodium persulfate, potassium persulfate, ammonium persulfate, potassium superphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, and t-butyl peroxy isobutyrate; and azo compounds such as azobisisobutyronitrile, azobis-2,4-dimethylvaleronitrile, azobiscyclohexanecarbonitrile, and dimethyl azobis isobutylate.

In addition to the initiator, an activator may be used to accelerate the initiation reaction of a peroxide. For example, the activator may include one or more selected from the group consisting of sodium formaldehyde sulfoxylates, disodium ethylenediamine tetraacetates, ferrous sulfate, dextrose, sodium pyrrolate, and sodium sulfite.

For example, the emulsifiers used in the seed preparation step and the core preparation step may include one or more selected from the group consisting of sodium dodecyl sulfate, sodium dodecyl benzene sulfate, sodium octadecyl sulfate, sodium oleic sulfate, potassium dodecyl sulfate, potassium dodecyl benzene sulfate, sodium dodecyl benzene sulfonate, sodium lauryl sulfate, sodium oleate, potassium dodecyl benzene sulfonate, potassium octadecyl sulfate, and potassium oleate.

The emulsifiers included in the seed preparation step and the core preparation step are not the same as the reactive emulsifier included in the graft shell preparation step.

For example, acrylic graft copolymer latex prepared in the graft shell preparation step may be subjected to coagulation, aging, dehydration, washing, and drying to prepare a powder form.

For example, the coagulation may be performed using one or more selected from the group consisting of sulfuric acid, MgSO$_4$, CaCl$_2$, and Al$_2$(SO$_4$)$_3$, preferably CaCl$_2$.

Specifically, the acrylic graft copolymer latex may be coagulated in an aqueous calcium chloride solution at 65 to 80° C. under atmospheric pressure, aged at 90 to 95° C., dehydrated, washed, and dried for 20 to 40 minutes using hot blast at 85 to 95° C. to obtain powder particles of the copolymer.

In the present invention, atmospheric pressure is 1 atmosphere.

For example, the acrylic graft copolymer may be prepared by emulsion polymerization. In this case, impact strength, tensile strength, weather resistance, and surface gloss may be excellent.

Emulsion graft polymerization commonly practiced in the art to which the present invention pertains may be used in the present invention without particular limitation.

The alkyl acrylate compound, the aromatic vinyl compound, and the vinyl cyanide compound included in the method of preparing the acrylic graft copolymer may be the same compounds as used to prepare the acrylic graft copolymer.

In addition, the thermoplastic resin composition of the present invention may include, for example, (A) 20 to 50 parts by weight of the acrylic graft copolymer; (B) 1 to 15 parts by weight of an acrylate-aromatic vinyl compound-vinyl cyanide compound graft copolymer containing acrylate rubber having an average particle diameter of 0.2 to 0.6 μm as a core; and (C) 45 to 70 parts by weight of a rigid matrix resin. The thermoplastic resin composition preferably includes (A) 35 to 45 parts by weight of the acrylic graft copolymer; (B) 5 to 10 parts by weight of an acrylate-aromatic vinyl compound-vinyl cyanide compound graft copolymer containing acrylate rubber having an average particle diameter of 0.25 to 0.45 μm as a core; and (C) 50 to 60 parts by weight of a rigid matrix resin. In this case, impact strength, tensile strength, weather resistance, and surface gloss may be excellent.

For example, the graft copolymer (B) may be a copolymer prepared by polymerizing 40 to 60% by weight of acrylate rubber, 25 to 45% by weight of an aromatic vinyl compound, and 1 to 20% by weight of a vinyl cyanide compound. Within this range, impact strength, tensile strength, weather resistance, and surface gloss may be excellent.

As a preferred example, the graft copolymer (B) may be a copolymer prepared by polymerizing 45 to 55% by weight of acrylate rubber, 30 to 40% by weight of an aromatic vinyl compound, and 10 to 20% by weight of a vinyl cyanide compound. Within this range, impact strength, tensile strength, weather resistance, and surface gloss may be excellent.

For example, the graft copolymer (B) may be prepared by emulsion polymerization. In this case, impact strength, tensile strength, weather resistance, and surface gloss may be excellent.

Emulsion graft polymerization commonly practiced in the art to which the present invention pertains may be used in the present invention without particular limitation.

The average particle diameter of acrylate rubber in the graft copolymer (B) is preferably 0.2 to 0.5 μm, more preferably 0.25 to 0.45 μm. Within this range, impact strength, tensile strength, weather resistance, and surface gloss may be excellent.

For example, the rigid matrix resin may be a vinyl cyanide compound-aromatic vinyl compound copolymer, preferably a styrene-acrylonitrile copolymer (SAN resin), an α-methyl styrene-acrylonitrile copolymer (heat-resistant SAN resin), or a mixture thereof, more preferably an α-methyl styrene-based compound-acrylonitrile copolymer. In this case, processability may be improved, and heat resistance may be excellent.

Preferably, the α-methyl styrene-acrylonitrile copolymer is a copolymer prepared by polymerizing 70 to 85% by weight of α-methylstyrene and 15 to 30% by weight of acrylonitrile. Within this range, heat resistance may be excellent.

For example, the α-methyl styrene-acrylonitrile copolymer may have a weight average molecular weight of 80,000 to 120,000 g/mol, preferably 90,000 to 110,000 g/mol. Within this range, processability and heat resistance may be excellent.

In this description, unless otherwise defined, weight average molecular weight may be measured using gel permeation chromatography (GPC, Waters Breeze). As a specific example, weight average molecular weight may be measured using tetrahydrofuran (THF) as an eluate through gel permeation chromatography (GPC, Waters Breeze). In this case, weight average molecular weight is obtained as a relative value to a standard polystyrene (PS) specimen.

For example, the vinyl cyanide compound-aromatic vinyl compound copolymer may be prepared by suspension polymerization, emulsion polymerization, solution polymerization, or bulk polymerization, preferably bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

For example, the thermoplastic resin composition may have a ΔE value of 1.9 or less, preferably 1 to 1.8, more preferably 1.2 to 1.6 as measured using an accelerated weather resistance tester (Weather-O-Meter, Ci4000, ATLAS Co., xenon arc lamp, Quartz (inner)/S.Boro (outer) filters, irradiance of 0.55 W/m² at 340 nm) for 6,000 hours according to SAE J1960 and then calculated using Equation 2 below. Within this range, physical property balance may be excellent, and weather resistance required in automobiles or architectural exterior materials may be obtained.

$$\Delta E = \sqrt{(L'-L)^2 + (a'-a)^2 + (b'-b)^2} \quad \text{[Equation 2]}$$

For example, when continuous injection of 100 shots is performed under injection molding conditions of a temperature of 200 to 260° C. and a pressure of 30 to 100 bar using an injection machine (LS Co., clamping force: 220 tons) equipped with a detachable mold core, the weight of the mold core in which gas has been deposited is measured, and then the weight of mold deposits is calculated using Equation 3 below, the content of mold deposits in the thermoplastic resin composition is 6.2 mg or less, preferably 3.5 to 6.2 mg, more preferably 4 to 5.5 mg, still more preferably 4.5 to 5.3 mg. Within this range, physical property balance and appearance may be improved, and productivity may be increased.

Mold deposits (mg)=Weight of mold core after 100 shots−Weight of initial mold core   [Equation 3]

For example, the thermoplastic resin composition may have 2,700 ppm or less, preferably 1,500 to 2,700 ppm, more preferably 2,000 to 2,600 ppm, still more preferably 2,100 to 2,500 ppm of volatile organic compounds (TVOCs) as measured after holding at 230° C. for 10 minutes using a purge-and-trap gas chromatograph/mass spectrometer. Within this range, physical property balance and weather resistance may be excellent, and mold deposits may be reduced.

In the present invention, volatile organic compounds (TVOCs) refer to liquids or gaseous organic compounds that have a low boiling point and thus easily evaporate into the atmosphere. For example, volatile organic compounds may include solvents widely used in industry, organic gases emitted from chemical and pharmaceutical factories or during plastic drying processes, and the like. As specific examples, volatile organic compounds may include liquid fuels with low boiling points, paraffin, olefins, aromatic compounds, and the like.

For example, the thermoplastic resin composition may have an Izod impact strength of 10 kgf·cm/cm or more, preferably 10 to 15 kgf·cm/cm, more preferably 11 to 14.5 kgf·cm/cm as measured using a ¼" thick specimen according to ASTM D256. Within this range, physical property balance may be excellent.

For example, the thermoplastic resin composition may have a tensile strength of 470 kg/cm² or more, preferably 470 to 550 kg/cm², more preferably 480 to 520 kg/cm², still more preferably 500 to 515 kg/cm² as measured according to ASTM D638. Within this range, physical property balance may be excellent.

For example, the thermoplastic resin composition may have a fluidity of 7.5 g/10 min or more, preferably 7.5 to 10 g/10 min, more preferably 8 to 9.5 g/10 min as measured under conditions of 220° C. and 10 kg according to ASTM D1238. Within this range, physical property balance may be excellent, and molding may be easy due to excellent fluidity.

For example, the thermoplastic resin composition may have a heat deflection temperature of 89.5° C. or more, preferably 89.5 to 95° C., more preferably 90 to 92° C. as measured according to ASTM D648. Within this range, physical property balance may be excellent.

When necessary, the thermoplastic resin composition may further include 0.01 to 5 parts by weight, preferably 0.05 to 3 parts by weight, more preferably 0.1 to 2 parts by weight, still more preferably 0.5 to 1 part by weight of one or more selected from the group consisting of lubricants, antioxidants, dyes, pigments, colorants, release agents, antistatic agents, antibacterial agents, processing aids, metal deactivators, flame retardants, smoke suppressants, anti-drip agents, anti-friction agents, and anti-wear agents. Within this range, required physical properties may be implemented without deteriorating the intrinsic physical properties of the thermoplastic resin composition of the present invention.

For example, the method of preparing the thermoplastic resin composition of the present invention includes a step of mixing (A) 20 to 50 parts by weight of the acrylic graft copolymer; (B) 1 to 15 parts by weight of an acrylate-aromatic vinyl compound-vinyl cyanide compound graft copolymer containing acrylate rubber having an average particle diameter of 0.2 to 0.6 μm as a core; and (C) 45 to 70 parts by weight of a rigid matrix resin and preparing pellets using an extrusion kneader at 200 to 250° C. In this case, a thermoplastic resin composition having mechanical properties and processability that are equal or superior to those of conventional ASA resins and having excellent weather resistance and surface gloss may be provided. In addition, mold deposits may be reduced during long-term injection molding.

The method of preparing the thermoplastic resin composition shares all the technical characteristics of the above-described thermoplastic resin composition. Accordingly, descriptions of overlapping parts will be omitted.

The step of preparing pellets using an extrusion kneader is preferably performed at 200 to 250° C., more preferably 210 to 230° C. In this case, the temperature refers to cylinder temperature.

Extrusion kneaders commonly used in the art to which the present invention pertains may be used in the present invention without particular limitation. Preferably, a twin-screw extrusion kneader is used.

A molded article of the present invention includes the thermoplastic resin composition of the present invention. In this case, the molded article of the present invention may have mechanical properties and processability equal or superior to those of conventional molded articles, and may have excellent weather resistance and surface gloss. In addition, mold deposits may be reduced.

For example, the molded article may be an extrusion molded article or an injection molded article, preferably an injection molded article, more preferably a molded article used as an automotive part, such as a radiator grille or a side mirror.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

Acrylate-aromatic vinyl compound-vinyl cyanide compound graft copolymer containing acrylate rubber having an average particle diameter of 0.2 to 0.6 μm as a core: SA927 (LG Chemical Co., core: 50% by weight of an acrylate polymer having an average particle diameter of 0.3 μm, shell: 38% by weight of styrene and 12% by weight of acrylonitrile)

Rigid matrix resin: 100UH (LG Chemical Co., 69% by weight of α-methyl styrene and 31% by weight of acrylonitrile)

Benzotriazole-based reactive ultraviolet stabilizer: RUV-1 (2-[3-(2H-benzotriazol-2-yl)-4-hydroxyphenyl]ethyl methacrylate)

Benzophenone-based reactive ultraviolet stabilizer: RUV-2 (2-(4-benzoyl-3-hydroxyphenoxy)ethyl acrylate)

Benzophenone-based reactive ultraviolet stabilizer: RUV-3 (2-(4-benzoyl-3-hydroxyphenoxy)amidoethyl methacrylate; 2-(4-benzoyl-3-hydroxyphenoxy)carbonyl]amino}ethyl 2-methylprop-2-enoate)

Ultraviolet stabilizer: Tinuvin P (BASF Co.)
Lubricant: EBS10 (LG Household & Health Care Co.)
Antioxidant: Songnox1076 (SONGWON Co.)

Example 1

<Seed Preparation Step>

15 parts by weight of butyl acrylate, 2.0 parts by weight of sodium dodecyl sulfate, 0.1 parts by weight of ethylene glycol dimethacrylate, 0.03 parts by weight of allyl methacrylate, 0.1 parts by weight of potassium hydroxide, and parts by weight of distilled water were fed into a nitrogen-substituted reactor batchwise, temperature was raised to 70° C., and then 0.04 parts by weight of potassium persulfate was added to the reactor to initiate reaction. Thereafter, polymerization was performed for 1 hour.

After reaction, it was confirmed that the average particle diameter of the obtained rubber polymer was 50 nm.

<Core Preparation Step>

A mixture containing 35 parts by weight of butyl acrylate, 0.3 parts by weight of sodium dodecyl sulfate, 0.25 parts by weight of ethylene glycol dimethacrylate, 0.1 parts by weight of allyl methacrylate, 35 parts by weight of distilled water, and 0.03 parts by weight of potassium persulfate was continuously added to the polymer seed for 1 hour at 70° C., and then polymerization was further performed for 0.5 hours.

After reaction, it was confirmed that the average particle diameter of the obtained rubber polymer was 70 nm.

<Graft Shell Preparation Step>

Polymerization was performed while continuously feeding 23 parts by weight of distilled water, 38 parts by weight of styrene, 12 parts by weight of acrylonitrile, and an emulsion containing 1.0 part by weight of RUV-1 as a reactive ultraviolet stabilizer, 1.8 parts by weight of potassium rosinate, 0.1 parts by weight of TDDM, and 0.05 parts by weight of cumene hydroperoxide and a mixed liquid containing 0.09 parts by weight of sodium pyrophosphate, 0.12 parts by weight of dextrose, and 0.002 parts by weight of ferrous sulfide for 2.5 hours at 75° C. in the presence of the polymer core. In addition, to increase polymerization conversion rate, after addition of the mixture was completed, the mixture was further reacted at 75° C. for 0.5 hours, and then was cooled to 60° C. to terminate polymerization, thereby preparing acrylic graft copolymer latex.

The polymerization conversion rate of the prepared acrylic graft copolymer latex was 99.0%, and the final average particle diameter thereof was 90 nm.

<Preparation of Acrylic Graft Copolymer Powder>

0.8 parts by weight of an aqueous calcium chloride solution was added to the prepared acrylic graft copolymer latex, coagulation was performed at 70° C. under atmospheric pressure, aging was performed at 93° C., dehydration and washing were performed, and drying was performed for 30 minutes using hot blast at 90° C. to prepare acrylic graft copolymer powder.

<Preparation of Thermoplastic Resin Composition>

36 parts by weight of the acrylic graft copolymer powder, 8 parts by weight of an acrylate-aromatic vinyl compound-vinyl cyanide compound graft copolymer containing acrylate rubber having an average particle diameter of 0.2 to 0.6 μm as a core, 56 parts by weight of a rigid matrix resin, 0.5 parts by weight of a lubricant, and 0.5 parts by weight of an antioxidant were added and mixed. The mixture was extruded at a cylinder temperature of 220° C. using a 36 pi extrusion kneader to prepare a pellet. The pellet was injected to prepare a specimen for measuring physical properties.

Example 2

<Graft Shell Preparation Step>

Graft shell preparation was performed in the same manner as in Example 1, except that 1 part by weight of RUV-2 as a reactive UV stabilizer was used.

The polymerization conversion rate of the prepared acrylic graft copolymer latex was 99.2%, and the final average particle diameter thereof was 88 nm.

Example 3

<Seed Preparation Step>

Seed preparation was performed in the same manner as in Example 1, except that 15 parts by weight of butyl acrylate and 1.5 parts by weight of sodium dodecyl sulfate were fed to a nitrogen-substituted reactor.

After reaction, it was confirmed that the average particle diameter of the obtained rubber polymer was 75 nm.

<Core Preparation Step>

Core preparation was performed in the same manner as in Example 1.

After reaction, it was confirmed that the average particle diameter of the obtained rubber polymer was 105 nm.

<Graft Shell Preparation Step>

Graft shell preparation was performed in the same manner as in Example 1.

After reaction, it was confirmed that the polymerization conversion rate of the obtained acrylic graft copolymer was 99.0%, and the final average particle diameter thereof was 135 nm.

Example 4

<Graft Shell Preparation Step>

Graft shell preparation was performed in the same manner as in Example 3, except that 1 part by weight of RUV-2 as a reactive ultraviolet stabilizer was used.

After reaction, it was confirmed that the polymerization conversion rate of the obtained acrylic graft copolymer latex was 99.0%, and the final average particle diameter thereof was 130 nm.

Example 5

Preparation steps were performed in the same manner as in Example 1, except that 0.3 parts by weight of RUV-1 as a reactive ultraviolet stabilizer was added when preparing a graft shell.

After reaction, it was confirmed that the polymerization conversion rate of the obtained acrylic graft copolymer latex was 99.2%, and the final average particle diameter thereof was 92 nm.

Example 6

Preparation steps were performed in the same manner as in Example 1, except that 2.0 parts by weight of RUV-1 as a reactive ultraviolet stabilizer was added when preparing a graft shell.

After reaction, it was confirmed that the polymerization conversion rate of the obtained acrylic graft copolymer latex was 99.4%, and the final average particle diameter thereof was 91 nm.

Example 7

Preparation steps were performed in the same manner as in Example 1, except that 1.0 part by weight of RUV-3 as a reactive ultraviolet stabilizer was added when preparing a graft shell.

After reaction, it was confirmed that the polymerization conversion rate of the obtained acrylic graft copolymer latex was 99.3%, and the final average particle diameter thereof was 91 nm.

Example 8

Preparation steps were performed in the same manner as in Example 3, except that 1.0 part by weight of RUV-3 as a reactive ultraviolet stabilizer was added when preparing a graft shell.

After reaction, it was confirmed that the polymerization conversion rate of the obtained acrylic graft copolymer latex was 99.0%, and the final average particle diameter thereof was 136 nm.

Example 9

Preparation steps were performed in the same manner as in Example 5, except that 1.0 part by weight of RUV-3 as a reactive ultraviolet stabilizer was added when preparing a graft shell.

After reaction, it was confirmed that the polymerization conversion rate of the obtained acrylic graft copolymer latex was 99.4%, and the final average particle diameter thereof was 90 nm.

Comparative Example 1

<Graft Shell Preparation Step>

Graft shell preparation was performed in the same manner as in Example 1, except that a reactive ultraviolet stabilizer was not added.

After reaction, it was confirmed that the polymerization conversion rate of the obtained acrylic graft copolymer was 99.3%, and the final average particle diameter thereof was 86 nm.

<Preparation of Thermoplastic Resin Composition>

38 parts by weight of the acrylic graft copolymer powder, 8 parts by weight of an acrylate-aromatic vinyl compound-vinyl cyanide compound graft copolymer containing acrylate rubber having an average particle diameter of 0.2 to 0.6 μm as a core, 56 parts by weight of a rigid matrix resin, 0.5 parts by weight of a lubricant, 0.5 parts by weight of an antioxidant, and 0.4 parts by weight of Tinuvin P as an ultraviolet stabilizer were added and mixed. The mixture was extruded at a cylinder temperature of 220° C. using a 36 pi extrusion kneader to prepare a pellet. The pellet was injected to prepare a specimen for measuring physical properties.

Comparative Example 2

<Seed Preparation Step>

Seed preparation was performed in the same manner as in Example 1, except that 15 parts by weight of butyl acrylate and 3.0 parts by weight of sodium dodecyl sulfate were added to a nitrogen-substituted reactor.

After reaction, it was confirmed that the average particle diameter of the obtained rubber polymer was 33 nm.

<Core Preparation Step>

Core preparation was performed in the same manner as in Example 1.

After reaction, it was confirmed that the average particle diameter of the obtained rubber polymer was 53 nm.

Comparative Example 3

<Seed Preparation Step>

Seed preparation was performed in the same manner as in Example 1, except that 15 parts by weight of butyl acrylate and 1.2 parts by weight of sodium dodecyl sulfate were added to a nitrogen-substituted reactor.

After reaction, it was confirmed that the average particle diameter of the obtained rubber polymer was 90 nm.

<Core Preparation Step>

Core preparation was performed in the same manner as in Example 1.

After reaction, it was confirmed that the average particle diameter of the obtained rubber polymer was 125 nm.

<Graft Shell Preparation Step>

Graft shell preparation was performed in the same manner as in Example 1.

After reaction, it was confirmed that the polymerization conversion rate of the obtained acrylic graft copolymer was 98.5%, and the final average particle diameter thereof was 155 nm.

Comparative Example 4

<Graft Shell Preparation Step>

Graft shell preparation was performed in the same manner as in Example 1, except that 2.5 parts by weight of RUV-1 as a reactive ultraviolet stabilizer was added when preparing a graft shell.

Reference Example 1

Preparation steps were performed in the same manner as in Example 1, except that, in the graft shell preparation step, 2.0 parts by weight of potassium rosinate was used instead of a reactive emulsifier.

Reference Example 2

Preparation steps were performed in the same manner as in Example 1, except that, in the graft shell preparation step, 4 parts by weight of a reactive emulsifier were used.

Test Examples

The properties of the specimens prepared in Examples 1 to 9, Comparative Examples 1 to 4, and Reference Examples 1 and 2 were measured according the following methods, and the results are shown in Tables 1 to 3.

Measurement Methods

Grafting degree (%): Graft polymer latex was coagulated, washed, and dried to obtain powdered graft polymer latex, and 30 ml of acetone was added to 1 g of the powdered graft polymer latex, followed by stirring for 24 hours. Then, centrifugation was performed to separate insoluble matter that was not dissolved in acetone, followed by drying. Then, the weight of the insoluble matter was measured. The measured value was substituted into Equation 1 below to calculate a grafting degree.

Grafting degree (%)=(Weight of grafted monomer (g)/Weight of rubber (g))×100    [Equation 1]

Izod impact strength (kgf·cm/cm): Izod impact strength was measured using a ¼" thick specimen according to ASTM D256.

Polymerization conversion rate: After drying 1.5 g of prepared latex in a hot blast dryer at 150° C. for 15 minutes, the weight of the latex was measured, and total solids content (TSC) was calculated using Equation 4 below. Then, the calculated total solids content value was substituted into Equation 5 below to calculate polymerization conversion rate.

In Equation 4, the total weight of added monomers is 100 parts by weight.

Total solids content (TSC;%)=(Weight after drying/ Weight before drying)×100    [Equation 4]

Polymerization conversion rate (%)=[Total solids content (TSC)×(Total weight of added monomers, deionized water, and subsidiary raw materials)/100]−(Weight of added subsidiary raw materials excluding monomers and deionized water)    [Equation 5]

In Equation 4, the subsidiary raw materials refer to an initiator, an emulsifier, an electrolyte, and a molecular weight modifier.

The added monomers refer to acrylate, an aromatic vinyl compound, and a vinyl cyanide compound.

Average particle diameter (nm): Average particle diameter was measured using a Nicomp 380 (manufacturer: PSS).

Weight average molecular weight (g/mol): Weight average molecular weight was measured at 40° C. using tetrahydrofuran (THF) as an eluate using a gel chromatograph (GPC) filled with porous silica as a column packing material. In this case, weight average molecular weight was obtained as a relative value to a standard polystyrene (PS) specimen.

Melt flow index (MI): The melt flow index of the prepared pellet was measured under conditions of 220° C. and 10 kg according to ASTM D1238. Here, the unit of melt flow index is g/10 min.

Tensile strength (kg/cm$^2$): Tensile strength was measured according to ASTM D638.

Heat deflection temperature (° C.): Heat deflection temperature was measured according to ASTM D648.

Weather resistance (ΔE): Weather resistance was measured using an accelerated weather resistance tester (Weather-O-Meter, Ci4000, ATLAS Co., xenon arc lamp, Quartz (inner)/S.Boro (outer) filters, irradiance of 0.55 W/m$^2$ at 340 nm) for 6,000 hours according to SAE J1960, and then a ΔE value was calculated using Equation 2 below. Weather resistance increases as the value of ΔE approaches zero.

$$\Delta E=\sqrt{(L'-L)^2+(a'-a)^2+(b'-b)^2}$$    [Equation 2]

TVOC analysis (JTD-GC/MS-02): Purge and trap were performed at 230° C. for 10 minutes using a purge-and-trap gas chromatograph/mass spectrometer, and then a total volatilization amount was measured using GC-MS. The measured value was quantified using toluene as a standard reagent.

Mold deposits (mg): Continuous injection of 100 shots was performed under injection molding conditions of injection machine temperatures of 260° C.-260° C.-255° C.-245° C. and injection pressure of 70 bar/ injection back pressure of 100 bar using an injection machine (LS Co., clamping force: 220 tons) equipped with a detachable mold core, the weight of the mold core in which volatilized materials had been deposited was measured, and then the content of mold deposits was calculated using Equation 3 below.

Mold deposits (after 100 shots, mg)=Weight of mold core after 100 shots−Weight of initial mold core    [Equation 3]

TABLE 1

| Classification | | Example 1 | Example 2 | Example 3 | Example 4 | Example 5 |
|---|---|---|---|---|---|---|
| Acrylic graft copolymer | Polymerization conversion rate | 99.0 | 99.2 | 99.0 | 99.0 | 99.2 |
| | Final particle diameter | 90 | 88 | 135 | 130 | 92 |
| | Weight average molecular weight | 120,000 | 121,000 | 120,000 | 120,000 | 110,000 |
| | Grafting degree | 26 | 26 | 31 | 30 | 26.5 |
| Thermoplastic resin composition | Impact strength | 12.0 | 12.8 | 14.2 | 14.0 | 11.0 |

TABLE 1-continued

| Classification | | Example 1 | Example 2 | Example 3 | Example 4 | Example 5 |
|---|---|---|---|---|---|---|
| resin composition | Fluidity | 8.5 | 8.4 | 9.0 | 9.0 | 9.0 |
| | Tensile strength | 510 | 507 | 500 | 505 | 505 |
| | Heat deflection temperature | 90.5 | 91.0 | 90.0 | 90.0 | 90.0 |
| | ΔE | 1.4 | 1.6 | 1.4 | 1.6 | 1.3 |
| | TVOC | 2600 | 2500 | 2400 | 2200 | 2500 |
| | Mold deposits | 5.5 | 5.4 | 5.2 | 5.3 | 5.1 |

TABLE 2

| Classification | | Example 6 | Example 7 | Example 8 | Example 9 |
|---|---|---|---|---|---|
| Acrylic graft copolymer | Polymerization conversion rate | 99.4 | 99.3 | 99.0 | 99.4 |
| | Final particle diameter | 91 | 91 | 136 | 90 |
| | Weight average molecular weight | 170,000 | 160,000 | 150,000 | 140,000 |
| | Grafting degree | 28.0 | 21.0 | 22.0 | 25.0 |
| Thermoplastic resin composition | Impact strength | 10.5 | 12.5 | 14.0 | 13.5 |
| | Fluidity | 7.5 | 8.0 | 8.3 | 8.5 |
| | Tensile strength | 480 | 520 | 515 | 510 |
| | Heat deflection temperature | 91.2 | 91.0 | 90.5 | 91.0 |
| | ΔE | 1.6 | 1.5 | 1.7 | 1.8 |
| | TVOC | 2550 | 2600 | 2500 | 2550 |
| | Mold deposits | 6.0 | 5.6 | 5.2 | 5.2 |

TABLE 3

| Classification | | Comparative Example 1 | Comparative Example 2 | Comparative Example 3 | Comparative Example 4 | Reference Example 1 | Reference Example 2 |
|---|---|---|---|---|---|---|---|
| Acrylic graft copolymer | Polymerization conversion rate | 99.3 | 99.5 | 99.5 | 99.5 | 99.0 | 99.5 |
| | Final particle diameter | 86 | 69 | 155 | 91 | 90 | 91 |
| | Molecular weight | 130,000 | 135,000 | 115,000 | 200,000 | 115,000 | 140,000 |
| | Grafting degree | 26 | 20 | 35 | 30.3 | 26 .. 5 | 25.5 |
| Thermoplastic resin composition | Impact strength | 10.0 | 7.0 | 15 | 8.0 | 11.5 | 12.5 |
| | Fluidity | 7.0 | 6.0 | 10.0 | 6.0 | 9.0 | 7.0 |
| | Tensile strength | 520 | 525 | 480 | 450 | 505 | 520 |
| | Heat deflection temperature | 91.0 | 91.5 | 89.5 | 90.5 | 90.1 | 91.0 |
| | ΔE | 2.0 | 1.4 | 3.5 | 2.5 | 2.0 | 2.5 |
| | TVOC | 4100 | 3100 | 2500 | 3000 | 3200 | 4000 |
| | Mold deposits | 15.5 | 6.5 | 5.5 | 7.0 | 6.0 | 9.0 |

As shown in Tables 1 to 3, compared to Comparative Example 1 in which a reactive ultraviolet stabilizer is not included in the shell of an acrylic graft copolymer, Comparative Examples 2 and 3 in which the average particle diameter of a graft shell is out of the range of 80 to 140 nm, and Comparative Example 4 in which an excess of a reactive ultraviolet stabilizer is included in the shell of an acrylic graft copolymer, in the case of Examples 1 to 9 according to the present invention, impact strength, fluidity, tensile strength, heat deflection temperature, and weather resistance are excellent, and generation of TVOCs is suppressed, thereby reducing mold deposits.

In particular, in the case of Comparative Example 1 in which an ultraviolet stabilizer as an additive is added when preparing a thermoplastic resin composition, impact strength and fluidity are reduced, weather resistance is poor, the amount of generated TVOCs increases, and mold deposits increase significantly.

In addition, compared to Examples 1 to 6, in the case of Reference Example 1 in which potassium rosinate is used instead of a reactive emulsifier in the graft shell preparation step, weather resistance deteriorates, and the amount of generated TVOCs is greatly increased. Mold deposits are produced at a level similar to that of Examples 1 to 6.

In addition, compared to Examples 1 to 9, in the case of Reference Example 2 in which an excess of a reactive emulsifier is used in the graft shell preparation step, weather resistance deteriorates, mold deposits are increased, and the amount of generated TVOCs is greatly increased.

The invention claimed is:

1. An acrylic graft copolymer, comprising:
based on 100 parts by weight in total of monomers used in preparation of the acrylic graft copolymer,
(A) a seed prepared by polymerizing 4 to 25 parts by weight of one or more selected from the group consisting of an aromatic vinyl compound, a vinyl cyanide compound, and an alkyl acrylate compound;
(B) a rubber core formed to surround the seed and prepared by polymerizing 25 to 55 parts by weight of an alkyl acrylate compound; and
(C) a graft shell formed to surround the rubber core and prepared by polymerizing 40 to 70 parts by weight of one or more selected from the group consisting of an aromatic vinyl compound and a vinyl cyanide compound,
wherein the graft shell comprises 0.05 to 2 parts by weight of a reactive ultraviolet stabilizer based on 100 parts by weight of the acrylic graft copolymer, and
the graft shell surrounding the shell and the core has a number average particle diameter of 80 to 140 nm.

2. The acrylic graft copolymer according to claim 1, wherein the reactive ultraviolet stabilizer is a benzotriazole-based reactive ultraviolet stabilizer, a benzophenone-based reactive ultraviolet stabilizer, or a mixture thereof.

3. The acrylic graft copolymer according to claim 2, wherein the benzotriazole-based reactive ultraviolet stabilizer is a compound represented by Chemical Formula 1 below, and the benzophenone-based reactive ultraviolet stabilizer is a compound represented by Chemical Formula 2 below, a compound represented by Chemical Formula 3 below, or a mixture thereof:

[Chemical Formula 1]

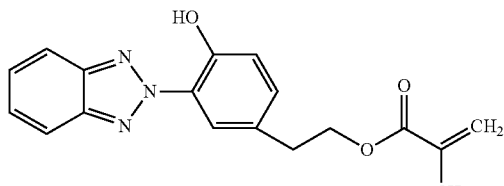

[Chemical Formula 2]

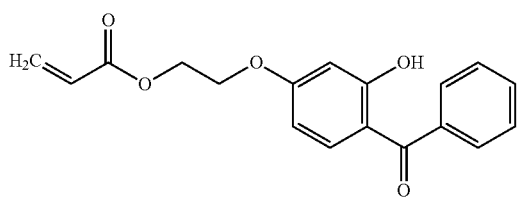

[Chemical Formula 3]

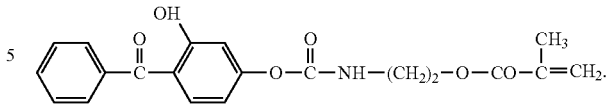

4. The acrylic graft copolymer according to claim 1, wherein the graft shell is a polymer prepared by polymerizing 0.1 to 3 parts by weight of a reactive emulsifier based on 100 parts by weight of the acrylic graft copolymer.

5. The acrylic graft copolymer according to claim 4, wherein the reactive emulsifier is an emulsifier comprising one or more functional groups selected from the group consisting of carbonates, sulfonates, and sulfates.

6. The acrylic graft copolymer according to claim 1, wherein the seed has an average particle diameter of 42 to 82 nm.

7. The acrylic graft copolymer according to claim 1, wherein the core comprising the seed has an average particle diameter of 62 to 110 nm.

8. A method of preparing an acrylic graft copolymer, the method comprising:
based on 100 parts by weight in total of monomers used in preparation of the acrylic graft copolymer,
(A) a seed preparation step of preparing a seed by polymerizing 4 to 25 parts by weight of one or more selected from the group consisting of an aromatic vinyl compound, a vinyl cyanide compound, and an alkyl acrylate compound;
(B) a core preparation step of preparing a core by adding and polymerizing 25 to 55 parts by weight of an alkyl acrylate compound in presence of the prepared seed; and
(C) a graft shell preparation step of preparing a shell by adding and graft-polymerizing 40 to 70 parts by weight of one or more selected from the group consisting of an aromatic vinyl compound and a vinyl cyanide compound and 0.05 to 2 parts by weight of a reactive ultraviolet stabilizer in presence of the prepared core,
wherein the graft shell surrounding the shell and the core has a number average particle diameter of 80 to 140 nm.

9. The method according to claim 8, wherein the reactive ultraviolet stabilizer is a benzotriazole-based reactive ultraviolet stabilizer, a benzophenone-based reactive ultraviolet stabilizer, or a mixture thereof.

10. The method according to claim 8, wherein, in the graft shell preparation step, 0.1 to 3 parts by weight of a reactive emulsifier is comprised.

11. A thermoplastic resin composition, comprising:
(A) 20 to 50 parts by weight of the acrylic graft copolymer of claim 1;
(B) 1 to 15 parts by weight of an acrylate-aromatic vinyl compound-vinyl cyanide compound graft copolymer containing acrylate rubber having an average particle diameter of 0.2 to 0.6 μm as a core; and
(C) 45 to 70 parts by weight of a rigid matrix resin.

12. The thermoplastic resin composition according to claim 11, wherein the thermoplastic resin composition has an ΔE value of 1.9 or less as measured using an accelerated weather resistance tester (Weather-O-Meter, Ci4000, ATLAS Co., xenon arc lamp, Quartz (inner)/S.Boro (outer) filters, irradiance of 0.55 W/m² at 340 nm) for 6,000 hours according to SAE J1960 and then calculated using Equation 2 below:

$$\Delta E = \sqrt{(L'-L)^2 + (a'-a)^2 + (b'-b)^2}$$ [Equation 2].

13. The thermoplastic resin composition according to claim 11, wherein, when continuous injection of 100 shots is performed under injection molding conditions of a temperature of 200 to 260° C. and a pressure of 30 to 100 bar using an injection machine (LS Co., clamping force: 220 tons) equipped with a detachable mold core, a weight of the mold core in which gas has been deposited is measured, and then a weight of mold deposits is calculated using Equation 3 below, the thermoplastic resin composition has 6.2 mg or less of mold deposits:

Mold deposits (mg)=Weight of mold core after 100shots−Weight of initial mold core. [Equation 3]

14. The thermoplastic resin composition according to claim 11, wherein the thermoplastic resin composition has 2,700 ppm or less of total volatile organic compounds (TVOCs) as measured after holding at 230° C. for 10 minutes using a purge-and-trap gas chromatograph/mass spectrometer.

\* \* \* \* \*